United States Patent
Tamaru et al.

(10) Patent No.: US 10,320,208 B2
(45) Date of Patent: Jun. 11, 2019

(54) ELECTRICITY STORAGE DEVICE

(71) Applicant: KABUSHIKI KAISHA TOYOTA JIDOSHOKKI, Kariya-shi, Aichi-ken (JP)

(72) Inventors: Kojiro Tamaru, Kariya (JP); Motoaki Okuda, Kariya (JP); Hiroyasu Nishihara, Kariya (JP); Takayuki Hirose, Kariya (JP)

(73) Assignee: KABUSHIKI KAISHA TOYOTA JIDOSHOKKI, Kariya-shi, Aichi-ken (JP)

( * ) Notice: Subject to any disclaimer, the term of this patent is extended or adjusted under 35 U.S.C. 154(b) by 179 days.

(21) Appl. No.: 15/309,894

(22) PCT Filed: Apr. 6, 2015

(86) PCT No.: PCT/JP2015/060757
§ 371 (c)(1),
(2) Date: Nov. 9, 2016

(87) PCT Pub. No.: WO2015/174165
PCT Pub. Date: Nov. 19, 2015

(65) Prior Publication Data
US 2017/0163059 A1 Jun. 8, 2017

(30) Foreign Application Priority Data
May 12, 2014 (JP) .................................. 2014-098646

(51) Int. Cl.
*H02J 7/00* (2006.01)
*H01G 11/74* (2013.01)
(Continued)

(52) U.S. Cl.
CPC ............ *H02J 7/0031* (2013.01); *H01G 11/16* (2013.01); *H01G 11/74* (2013.01); *H01G 11/80* (2013.01);
(Continued)

(58) Field of Classification Search
CPC ...................................................... H01M 2/345
(Continued)

(56) References Cited

U.S. PATENT DOCUMENTS

2010/0323234 A1\* 12/2010 Kim ...................... H01M 2/206
429/158
2011/0287311 A1\* 11/2011 Kim ........................ H01M 2/06
429/181
(Continued)

FOREIGN PATENT DOCUMENTS

JP 2003-86171 A 3/2003
JP 2004-253295 A 9/2004
(Continued)

OTHER PUBLICATIONS

English translation of Takagi, Shigeru, JP 2004253295 A, Sep. 2004, Japan.\*
(Continued)

*Primary Examiner* — Cynthia H Kelly
*Assistant Examiner* — Rashid A Alam
(74) *Attorney, Agent, or Firm* — Sughrue Mion, PLLC

(57) ABSTRACT

An electricity storage device includes a casing, a terminal, and a current interruption device. The terminal includes a column part and a base part. A first sealing member having an insulating property including a first sealing part sealing between the terminal and a terminal wall is provided between the terminal and the terminal wall, and surrounding an entire periphery of the column part. A first insulating member having an insulating property is disposed within a
(Continued)

first space provided between the terminal and the terminal wall on a casing inner side relative to the first sealing part, and surrounds the entire periphery of the column part. At least one of the first sealing member and the first insulating member is disposed in the first space from an end face of the first space on a casing outer side to an end face on the casing inner side thereof.

10 Claims, 7 Drawing Sheets

(51) Int. Cl.
*H01G 11/80* (2013.01)
*H01M 2/06* (2006.01)
*H01M 2/30* (2006.01)
*H01M 2/34* (2006.01)
*H01G 11/16* (2013.01)
*H01M 10/44* (2006.01)
*H01M 10/42* (2006.01)

(52) U.S. Cl.
CPC ............... *H01M 2/06* (2013.01); *H01M 2/30* (2013.01); *H01M 2/34* (2013.01); *H01M 10/44* (2013.01); *H01M 2010/4271* (2013.01); *H01M 2200/00* (2013.01); *H02J 2007/0037* (2013.01)

(58) Field of Classification Search
USPC .......................................................... 429/61
See application file for complete search history.

(56) References Cited

U.S. PATENT DOCUMENTS

| | | |
|---|---|---|
| 2012/0282502 A1 | 11/2012 | Kim |
| 2013/0011699 A1 | 1/2013 | Kim et al. |
| 2013/0101875 A1 | 4/2013 | Kim et al. |
| 2013/0196187 A1 | 8/2013 | Yokoyama et al. |
| 2017/0170448 A1* | 6/2017 | Okuda ................. H01M 2/345 |

FOREIGN PATENT DOCUMENTS

| | | | |
|---|---|---|---|
| JP | 2004253295 A | * | 9/2004 |
| JP | 2012-38529 A | | 2/2012 |
| JP | 2012-234813 A | | 11/2012 |
| JP | 2013-16483 A | | 1/2013 |
| JP | 2013-157137 A | | 8/2013 |
| JP | 2013-171817 A | | 9/2013 |
| JP | 2013-211144 A | | 10/2013 |
| JP | 2013218816 A | * | 10/2013 |
| JP | 2015-095370 A | | 5/2015 |
| JP | 2015-95441 A | | 5/2015 |
| KR | 1020130042882 A | | 4/2013 |

OTHER PUBLICATIONS

English translation of Minamigata Atsushi, JP 2013218816 A, Oct. 2013, Japan.*
International Search Report for PCT/JP2015/060757 dated Jun. 9, 2015.
Foreign Written Opinion for PCT/JP2015/060757 dated Jun. 9, 2015.
International Preliminary Report on Patentability with translation of Written Opinion dated Nov. 24, 2016, issued by the International Searching Authority in application No. PCT/JP2015/060757.

* cited by examiner

ELECTRICITY STORAGE DEVICE

CROSS REFERENCE TO RELATED APPLICATIONS

This application is a National Stage of International Application No. PCT/JP2015/060757 filed Apr. 6, 2015, claiming priority based on Japanese Patent Application No. 2014-098646 filed May 12, 2014, the contents of all of which are incorporated herein by reference in their entirety.

TECHNICAL FIELD

The technique disclosed herein relates to an electricity storage device provided with a current interruption device.

BACKGROUND ART

In a technical field of electricity storage devices, a development is being made for a current interruption device that interrupts current flowing through terminals (positive terminal and negative terminal) when an electricity storage device is over-charged or a short circuiting is generated therein. The current interruption device is arranged between a terminal and a collector tab (positive collector tab or negative collector tab). Japanese Patent Application Publication No. 2012-38529 discloses a current interruption device in which a conducting plate connected to a collector tab and a deformable plate connected to a terminal are bonded. When pressure inside a casing of an electricity storage device rises and exceeds a predetermined value, the current interruption device is operated and the deformable plate separates away from the conduction plate. As a result, current between the terminal and the conduction plate is interrupted.

SUMMARY

Technical Problem

In the electricity storage device of Japanese Patent Application Publication No. 2012-38529, the terminal is fixed to an opening provided on a terminal wall of the casing. A sealing member and an insulating member having insulating properties are provided between the terminal and the terminal wall. The sealing member is in contact with the terminal and the terminal wall, and seals therebetween. The insulating member is arranged with a clearance from the sealing member on a casing inner side relative to the sealing member. Due to this, a space is provided between the sealing member and the insulating member. In this space, the terminal and the terminal wall directly face each other. Here, there are some cases where electrolyte within the casing enters into this space by leaking through a clearance between the insulating member and the terminal and/or a clearance between the insulating member and the terminal wall. After the current interruption device had been operated, if a high voltage is applied between the terminal and the terminal wall in a state where the space is filled with the electrolyte, the terminal and the terminal wall may short circuit by the electrolyte filled in the space. Especially in an electricity storage device module in which a plurality of electricity storage devices is connected in series, since an extremely high voltage would be applied between the terminal and the terminal wall if one of the current interruption devices is operated, the possibility of the short circuiting between the terminal and the terminal wall becomes higher.

In the present disclosure, a technique that suppresses a terminal and a terminal wall from short circuiting is provided.

Solution to Technical Problem

An electricity storage device disclosed herein comprises a casing, a terminal, and a current interruption device. The casing is configured to accommodate electrolyte and an electrode assembly including a positive electrode and a negative electrode. The terminal is configured to extend from inside to outside of the casing through an opening provided on a terminal wall of the casing. The current interruption device is accommodated within the casing, is electrically connected to the terminal and one of the positive electrode and the negative electrode, and comprises a conductive member configured to switch the terminal and the one of the positive electrode and the negative electrode from a conductive state to a non-conductive state. The terminal comprises a column part inserted in the opening and a base part arranged on one end of the column part and disposed within the casing. The base pan is larger than the opening in a plan view of the terminal wall and is electrically connected to the conductive member. A first sealing member having an insulating property and comprising a first sealing part sealing between the terminal and the terminal wall by being in contact with both of the terminal and the terminal wall is disposed between the terminal and the terminal wall. The first sealing member surrounds an entire periphery of the column part. A first insulating member having an insulating property is disposed within a first space provided between the terminal and the terminal wall on a casing inner side relative to the first sealing part, and surrounds the entire periphery of the column part. At least one of the first sealing member and the first insulating member is disposed in the first space from an end face of the first space on a casing outer side to an end face of the first space on the casing inner side.

In the above electricity storage device, the terminal and the terminal wall are sealed by the first sealing part of the first sealing member located therebetween. Due to this, the electrolyte in the casing is suppressed from leaking out to a space on the casing outer side than the first sealing part. Further, in the electricity storage device, the terminal and the terminal wall will not face each other directly by at least one of the first sealing member and the first insulating member being arranged in the first space on the casing inner side relative to the first sealing part within the space between the terminal and the terminal wall. Thus, even if a high voltage is applied between the terminal and the terminal wall after the current interruption device has operated, the terminal and the terminal wall can be suppressed from becoming short circuited. Notably, the "casing inner side" refers to a direction in a space communicating outside and inside of the casing leading from the outer side toward the inner side of the casing, and the "casing outer side" refers to a direction in the space communicating outside and inside of the casing leading from the inner side toward the outer side of the casing. Thus, if the space between the terminal wall and the terminal (space communicating outside and inside of the casing) extends parallel to the terminal wall within the casing, a direction separating from the opening of the terminal wall becomes the "casing inner side", and a direction approaching the opening becomes the "casing outer side". Further, "facing" refers to a state in which two members face each other with an interval in between, and "contact" refers to a state in which two members are making contact.

Further, an the electricity storage device disclosed herein is provided with a casing, a terminal, and a current interruption device. The casing is configured to accommodate electrolyte and an electrode assembly including a positive electrode and a negative electrode. The terminal is configured to extend from inside to outside of the casing through an opening provided on a terminal wall of the casing. The current interruption device is accommodated within the casing, electrically connected to the terminal and one of the positive electrode and the negative electrode, and comprises a conductive member configured to switch the terminal and the one of the positive electrode and the negative electrode from a conductive state to a non-conductive state. The terminal comprises a column part inserted in the opening and a base part arranged on one end of the column part and disposed within the casing. The base part is larger than the opening in a plan view of the terminal wall and is electrically connected to the conductive member. A second sealing member having an insulating property and comprising a third sealing part sealing between the terminal and the terminal wall by being in contact with both of the terminal and the terminal wall is disposed between the terminal and the terminal wall. The second sealing member surrounds an entire periphery of the column part. A second insulating member having an insulating property is disposed within a second space provided between the terminal and the terminal wall on a casing inner side relative to the third sealing part, and surrounds the entire periphery of the column part. A third sealing member having an insulating property and comprising a fourth sealing part is disposed within a space where the second insulating member and one of the terminal wall and the terminal face each other, the fourth sealing part sealing between the second insulating member and one of the terminal wall and the terminal by being in contact with both of the second insulating member and the one of the terminal wall and the terminal, and surrounding the entire periphery of the column part. At least one of the second sealing member, the third sealing member, and the second insulating member is disposed in the second space from an end face of the second space on a casing outer side to an end face of the second space on the casing inner side.

In the above electricity storage device, the terminal and the terminal wall will not face each other directly by at least one of the second sealing member, the third sealing member, and the second insulating member being arranged in the second space on the casing inner side relative to the third sealing part within the space between the terminal and the terminal wall, as a result of which the terminal and the terminal wall can be suppressed from being short circuited. Further, in the above electricity storage device, the fourth sealing part of the third sealing member seals between the second insulating member and one of the terminal wall and the terminal on the casing inner side relative to the third sealing part of the second sealing member. Due to this, the electrolyte in the casing is suppressed from leaking out to the casing outer side than the fourth sealing part. Thus, in the space on the casing outer side relative to the fourth sealing pert within the second space, the terminal and the terminal wall are suppressed from making contact via the electrolyte, and the terminal and the terminal wall can further be prevented from being short circuited. Further, even if the electrolyte leaks out to the Easing outer side than the second insulating member through between the second insulating member and the terminal or the terminal wall, the third sealing part of the second scaling member suppresses the electrolyte from leaking out to the space on the casing outer side than the third sealing part.

Details and further improvements of the technique disclosed herein will be described in detail in the detailed description and embodiments.

DETAILED DESCRIPTION

Figure 1:
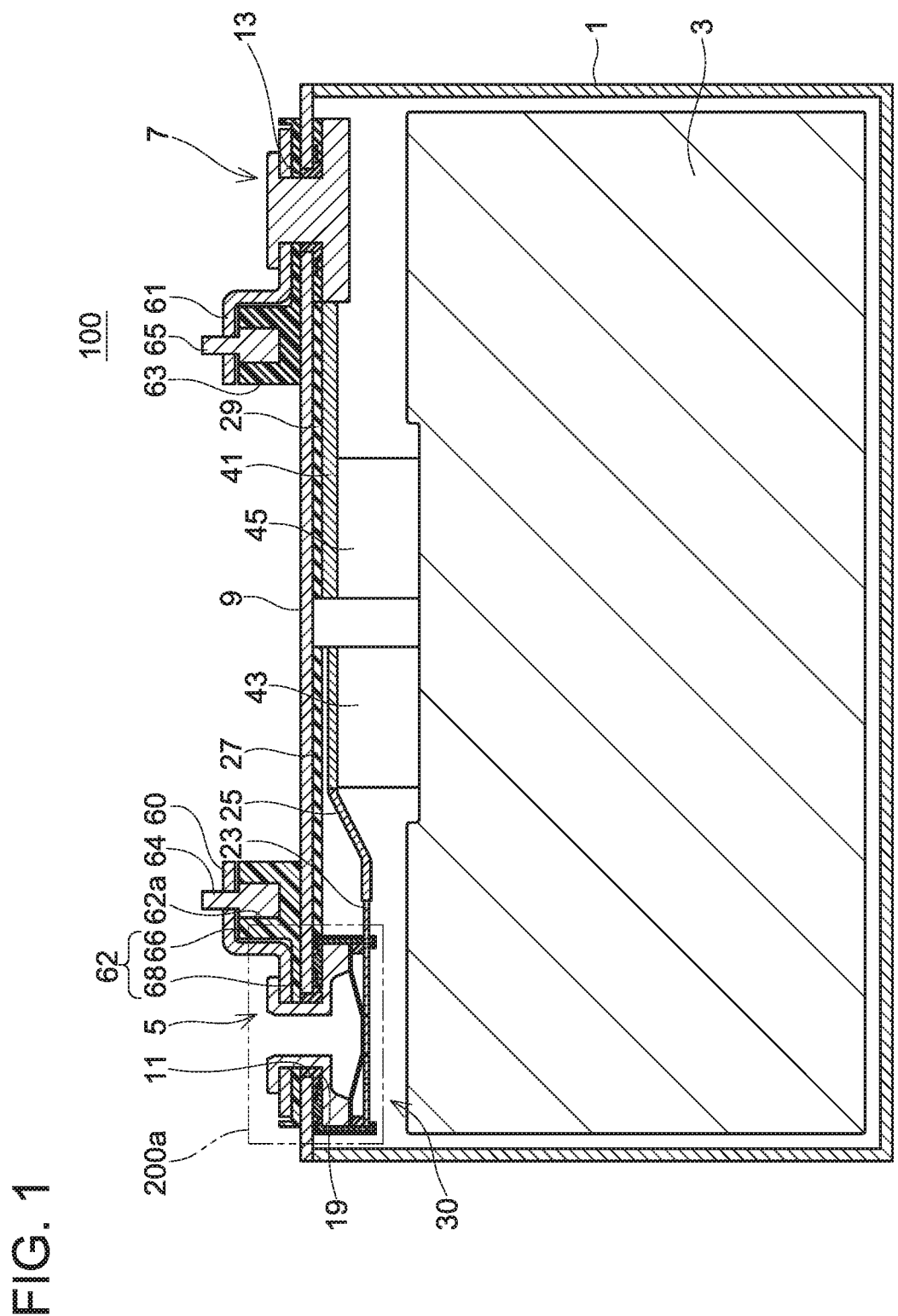
FIG. 1 is a vertical cross sectional view of an electricity storage device of a first embodiment.

Primary features of embodiments described hereinbelow will be listed. Notably, the technical elements described hereinbelow are each independent technical element, and exhibit technical usefulness alone or in various combinations, and are not limited to the combinations described in the claims at the time of filing.

In an electricity storage device disclosed herein, a first sealing member may comprise a second sealing part sealing between the first insulating member and one of the terminal wall and the terminal by being in contact with both of the first insulating member and the one of the terminal wall and the terminal in a space where the first insulating member and the one of the terminal wall and the terminal face each other. According to this configuration, since the second sealing part seals between the first insulating member and the one of the terminal wall and the terminal are sealed, the electrolyte flowing to the casing outer side between the first insulating member and the terminal wall and the electrolyte flowing to the casing outer side between the first insulating member and the terminal are suppressed from making contact. Due to this, in the first space, the terminal and the terminal wall are suppressed from making contact via the electrolyte, so short circuiting of the terminal and the terminal wall can further be suppressed.

In an electricity storage device disclosed herein, in addition to Feature 1, a first protrusion may be provided on at least one of the first insulating member, the terminal wall, and the terminal in a range where the second sealing part is present, and may project toward a first sealing member side. The first protrusion may be in contact with the first sealing member. According to this configuration, the sealing force of the second sealing part increases at a portion where the first protrusion makes contact. Due to this, as compared to a configuration in which the first protrusion is not provided, the electrolyte can further be suppressed from flowing to the casing outer side than the second sealing part. Further, the second sealing pert is locally compressed by the first protrusion. Due to this, as compared to a configuration in which an entirety of the second sealing pert is compressed, repulsive force of the second sealing part upon fixing the terminal to the terminal wall can be reduced. According to this configuration, the terminal can relatively easily be fixed to the terminal wall while increasing the sealing force between the first insulating member and the one of the terminal wall and the terminal.

In an electricity storage device disclosed herein, a second protrusion may be provided on one of the terminal and the terminal wall in a range where the first sealing member is present and where the terminal and the terminal wall overlap each other in the plan view of the terminal wall, the second protrusion extending toward the other of the terminal and the terminal wall. The second protrusion may be in contact with the first sealing member. According to this configuration, the sealing force of the first sealing part increases at a portion where the second protrusion is in contact. Due to this, as compared to a configuration in which the second protrusion is not provided, the electrolyte can further be suppressed from leaking out to a space outside the casing. Further, with the first sealing part being locally compressed by the second protrusion, as compared to a configuration in which an entirety of the first sealing part is compressed, repulsive force of the first scaling part upon fixing the terminal to the terminal wall can be reduced. According to this configuration, the terminal can relatively easily be fixed to the terminal wall while increasing the sealing force with the terminal wall and the terminal.

In an electricity storage device disclosed herein, in addition to Feature 3, the first sealing member may comprise a second sealing part sealing between the first insulating member and one of the terminal wall and the terminal by being in contact with both of the first insulating member and the one of the terminal wall and the terminal in a space where the first insulating member and the one of the terminal wall and the terminal face each other. A first protrusion may be provided on at least one of the first insulating member, the terminal wall, and the terminal in a range where the second scaling part is present, and may project toward a first sealing member side. The first protrusion may be in contact with the first sealing member. A compression rate of the first sealing member at a portion in contact with one protrusion, which is close to the column part of the terminal and being one of the first protrusion and the second protrusion, may be larger than a compression rate of the first sealing member at a portion in contact with the other protrusion, which is apart from the column part of the terminal and being the other of the first protrusion and the second protrusion. The repulsive force of the first sealing member upon fixing the terminal to the terminal wall becomes smaller on a closer side to the column part, if the compression rate of the first sealing member at the time of fixing the terminal is the same. Due to this, the sealing force at the portion of the protrusion close to the column part can be increased while suppressing the increase in the repulsive force of the first sealing member upon fixing the terminal.

In an electricity storage device disclosed herein, the terminal may comprise a fixation part arranged on the column part at an opposite side of a side where the base part is arranged on the column part, the fixation part being located outside the casing, and fixing the terminal to the terminal wall by bending outward in a direction perpendicular to an axis of the column part from the opposite side of the column part. One of the first sealing part and the third sealing part may be located in a range where the terminal and the terminal wall overlap each other, and where the fixation part is present in the plan view of the terminal wall. According to this configuration, a direction of load applied by the fixation part to the terminal wall upon fixing the terminal to the terminal wall and a direction of the compression force for providing sealing between the terminal and the terminal wall become same, and the one of the first sealing part and the third sealing part can provide strong sealing between the terminal and the terminal wall.

In an electricity storage device disclosed herein, the terminal may be fastened and fixed to the terminal wall by a nut provided outside the casing. One of the first sealing part and the third sealing part may be located in a range where the terminal and the terminal wall overlap each other, and where the nut is present in the plan view of the terminal wall. According to this configuration, a direction of tightening force that the nut applies to the terminal wall upon fixing the terminal to the terminal wall and the direction of the compression force for providing sealing between the terminal and the terminal wall become same, and the one of the first sealing part and the third sealing part can provide strong sealing between the terminal and the terminal wall.

Further, the description herein discloses an electricity storage device module that may comprise a plurality of the electricity storage devices as aforementioned, and in which the electricity storage devices are connected in series. In this electricity storage device module, the terminal and the terminal wall are configured not to face each other directly in the first or second space in each of the electricity storage devices configuring the electricity storage device module. Due to this, even if a high voltage is applied between the terminal and the terminal wall after the current interruption device has operated, the terminal and the terminal wall can be suppressed from becoming short circuited.

FIRST EMBODIMENT

Figure 2:
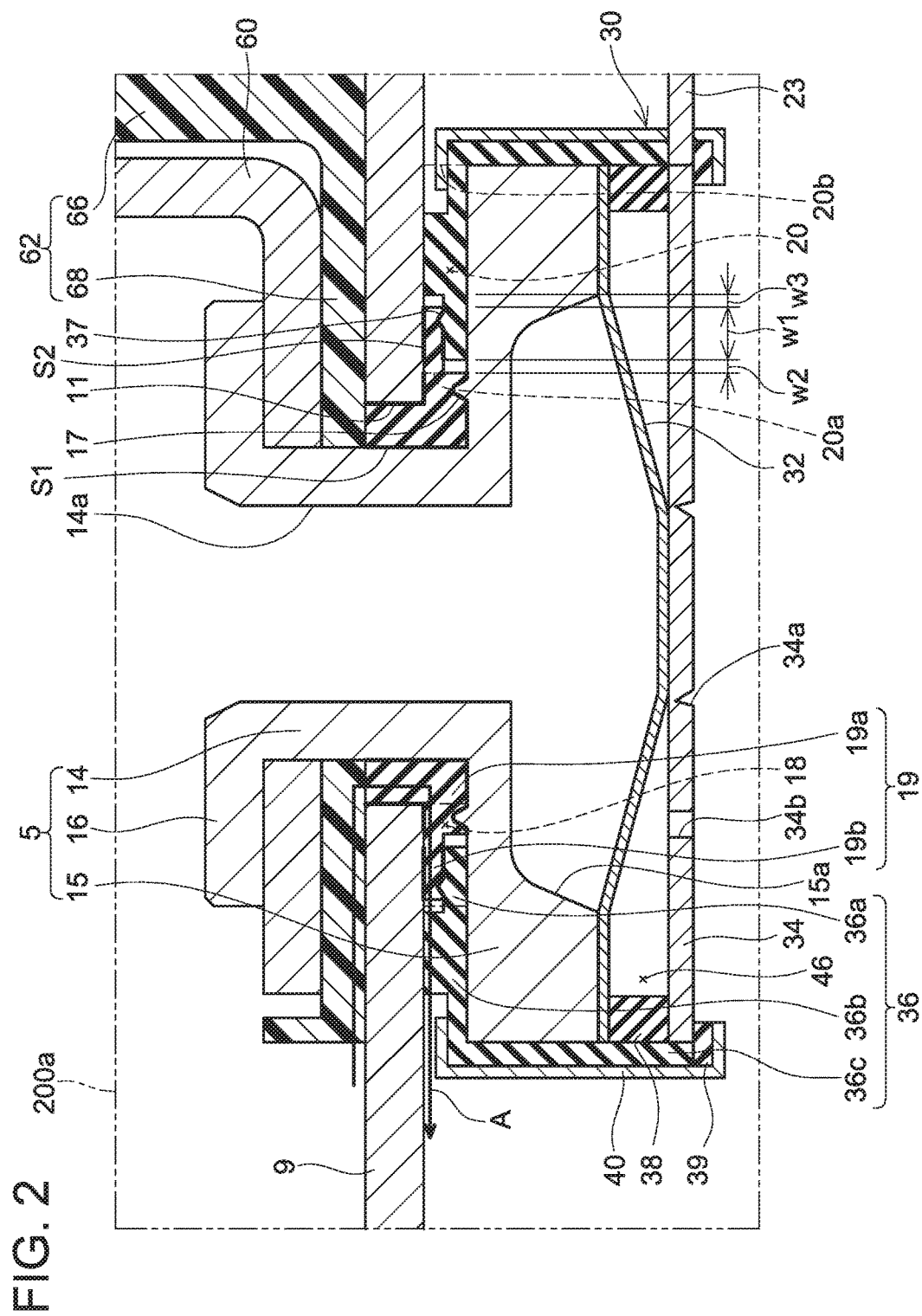
FIG. 2 is a partial enlarged view in a vicinity of a rivet terminal configuring a negative terminal of FIG. 1.

An electricity storage device 100 of a first embodiment will be described with reference to FIGS. 1 and 2. The electricity storage device 100 is a lithium ion secondary battery that is one type of secondary batteries. As shown in FIG. 1, the electricity storage device 100 includes a casing 1, an electrode assembly 3, rivet terminals 5, 7, and a current interruption device 30. The casing 1 is made of metal, and has a substantially rectangular solid shape. Inside of the casing 1 are the electrode assembly 3 and the current interruption device 30 accommodated therein. The electrode assembly 3 includes a negative electrode and a positive electrode. A negative collector tab 43 is fixed to the negative electrode, and a positive collector tab 45 is fixed to the positive electrode. An electrolyte is filled inside the casing 1. Notably, the rivet terminal 5 corresponds to an example of a "terminal".

The casing 1 has openings 11, 13 provided thereon. Hereinbelow, a wall on which the openings 11, 13 are provided in the casing 1 is especially termed a casing upper wall 9. That is, a side where the casing upper wall 9 is positioned relative to the electrode assembly 3 is an upper side, and an opposite side from the side where the casing upper wall 9 is positioned relative to the electrode assembly 3 is a lower side. The rivet terminal 5 extends inside and outside of the casing 1 through the opening 11, and the rivet terminal 7 extends inside and outside of the casing 1 through the opening 13. A lower end of the rivet terminal 5 is disposed within inside the casing 1, and is connected to the current interruption device 30 (to be described later). The current interruption device 30 is connected to the negative collector tab 43 via a connector terminal 23 and a negative lead 25. The negative lead 25 is insulated from the casing upper wall 9 by an insulating sheet 27. On the other hand, a lower end of the rivet terminal 7 is disposed within inside the casing 1, and is connected to the positive collector tab 45 via a positive lead 41. The positive lead 41 is insulated from the casing upper wall 9 by an insulating sheet 29. Notably, the casing upper wall 9 corresponds to an example of a "terminal wall".

Gaskets 62, 63 made of resin are provided on an upper surface of the casing upper wall 9. The gasket 62 includes a protrusion 66 protruding upward from the casing upper wall 9 and a flat plate 68 extending along the casing upper wall 9. The protrusion 66 is arranged at a center side of the casing upper wall 9, and the flat plate 68 is arranged on an opening 11 side of the casing upper wall 9. An external terminal 60 is arranged on an upper surface of the gasket 62 complying with the shape of the upper surface of the gasket 62. A head of a bolt 64 is arranged in a bottomed hole 62a provided on the protrusion 66. A shaft of the bolt 64 protrudes upward by passing through an opening of the external terminal 60. The rivet terminal 5, the external terminal 60, and the bolt 64 are electrically connected to each other, and configure a negative terminal. Configurations of the gasket 63, the external terminal 61, and the bolt 65 are similar to the configurations of the gasket 62, the external terminal 60, and the bolt 64 as described above. The rivet terminal 7, the external terminal 61, and the bolt 65 are electrically connected to each other, and configure a positive terminal.

Here, the rivet terminal 5 will be described with reference to FIG. 2. FIG. 2 is an enlarged view of a two-dot chain line portion 200a of FIG. 1. The rivet terminal 5 includes a cylinder part 14, a base part 15, and a fixation part 16. The cylinder part 14 has a cylindrical shape, and is inserted in the opening 11. A through hole 14a is provided in the cylinder part 14 in an axial direction (up and down direction). Due to this, inside of the through hole 14a is maintained at an atmospheric pressure. The base part 15 has a ring shape, and is arranged at a lower end of the cylinder part 14. That is, the base part 15 is disposed within the casing 1. An upper surface of the base part 15 is substantially vertical to the axial direction of the cylinder part 14. An outer diameter of the base part 15 is larger than a diameter of the opening 11. The cylinder part 14 and the base part 15 are arranged concentrically. A recess 15a is provided at a center of a lower surface of the base part 15. A center of the recess 15a and the through hole 14a are communicated, thus inside of the recess 15a is maintained at the atmospheric pressure. The fixation part 16 has a ring shape, and is arranged at an upper end of the cylinder part 14. That is, the fixation part 16 is positioned outside the casing 1. The rivet terminal 5 is fixed to the casing upper wall 9 by the fixation part 16. Prior to the rivet terminal 5 being fixed to the casing upper wall 9, the fixation part 16 extends in the axial direction of the cylinder part 14. That is, the cylinder part 14 and the fixation part 16 configure parts of one cylinder shape extending in the axial direction (hereinbelow, this portion will be termed a cylinder portion). Notably, the cylinder part 14 corresponds to an example of a "column part".

When the rivet terminal 5 is to be fixed to the casing upper wall 9, the cylinder portion is inserted through respective openings of an insulating member 36 (to be described later), a plate member 40 (to be described later), and a sealing member 19 (to be described later), and these members are placed on the upper surface of the base part 15. Then, the cylinder portion is inserted from inside the casing 1 through the opening 11, the opening of the gasket 62, and the opening of the external terminal 60. Thereafter, the upper portion of the cylinder portion (portion protruding outside the casing 1) is bent outward in a direction perpendicular to an axis of the cylinder portion and spread out. Due to this, the cylinder portion makes contact with an upper surface of the external terminal 60, and the rivet terminal 5 is riveted to the casing upper wall 9. The cylinder portion (that is, the bent portion of the cylinder portion) corresponds to the fixation part 16. By fixing the rivet terminal 5 on the casing upper wall 9, the sealing member 19, the insulating member 36, the gasket 62, and the external terminal 60 are retained between the rivet terminal 5 and the casing upper wall 9. At this occasion, the casing upper wall 9, the base part 15, and the fixation part 16 are substantially parallel to each other. The gasket 62 ensures insulation between the external terminal 60 and the casing upper wall 9.

Next, the members arranged between the rivet terminal 5 and the casing upper wall 9 will be described with reference to FIG. 2. An arrow A in FIG. 2 shows a direction from outside toward inside of the casing 1. Hereinbelow, the direction shown by the arrow A is termed a "casing inner side", and an opposite direction from the direction shown by the arrow A is termed a "casing outer side". This applies similarly to other embodiments and variants. The ring-shaped sealing member 19 having an insulating property is provided between the rivet terminal 5 and the casing upper wall 9. The sealing member 19 surrounds an entire periphery of the cylinder part 14. Perfluoroalkoxy alcan (PFA) is used as the sealing member 19. The sealing member 19 includes a thick part 19a and a thin part 19b. The thick part 19a makes contact with the casing upper wall 9, the cylinder part 14, and the base part 15 at a sealing position S1 (shown by a bold line in FIG. 2; hereinbelow, similarly, other sealing positions are also shown by bold lines). Specifically, the thick part 19a is compressed by the casing upper wall 9 and the cylinder part 14 as well as by the casing upper wall 9 and the base part 15, and a sealing is provided by repulsive force from the compression between the casing upper wall 9 and the rivet terminal 5. A protrusion 17 extending upward (that is, toward a casing upper wall 9 side) is provided on the upper surface of the base part 15 in a range where the sealing position S1 is present and where the casing upper wall 9 and the rivet terminal 5 overlap each other in a plan view of the casing upper wall 9. The protrusion 17 surrounds the entire periphery of the cylinder part 14. The protrusion 17 makes contact with the thick part 19a, and compresses the thick part 19a together with the casing upper wall 9 (strictly speaking, the casing upper wall 9 at a portion facing the protrusion 17). A clearance between the casing upper wall 9 and the protrusion 17 is shorter than a clearance between the casing upper wall 9 and the rivet terminal 5 at the sealing position S1 excluding the protrusion 17. Due to this, a compression rate of the thick part 19a at a portion where the protrusion 17 is in contact is higher than a compression rate of the thick part 19a at the sealing position S1 excluding the protrusion 17. In the present embodiment, the thick part 19a is compressed by about 50% at the portion where the protrusion 17 is in contact. Since the sealing member 19 is formed by an insulating material, the insulation between the casing upper wall 9 and the rivet terminal 5 is maintained. The thin part 19b having a thinner thickness than the thick part 19a is provided at an end of the sealing member 19 on the casing inner side. An upper surface of the thin part 19b makes contact with the casing upper wall 9, and a lower surface thereof makes contact with a thin part 36a of the insulating member 36 to be described later. Notably, a material of the sealing member 19 is not limited to the above, but may be a material having sealing property, insulation property, and electrolyte resistance property (for example, ethylene-propylene-based rubber (EPM) such as ethylene propylene diene rubber (EPDM)). Notably, the sealing member 19 corresponds to an example of a "first sealing member", the thick part 19a corresponds to an example of a "first sealing part", and the protrusion 17 corresponds to an example of a "second protrusion".

A ring-shaped insulating member 36 is arranged on the casing inner side relative to the thick part 19a. Polyphenylene sulfide (PPS) is used as the insulating member 36. The insulating member 36 surrounds the entire periphery of the cylinder part 14. The thin part 36a having a thin thickness in the up and down direction is provided at a casing outer side-end of the insulating member 36. A lower surface of the thin part 36a makes contact with the base part 15, and the thickness of the thin part 36a in the up and down direction is shorter than the clearance between the casing upper wall 9 and the rivet terminal 5. The thin part 19b of the sealing member 19 is arranged in a space where the casing upper wall 9 and the thin part 36a face each other. The thin part 19b makes contact with both the casing upper wall 9 and the thin part 36a at a sealing position S2. The thin part 19b is compressed by the casing upper wall 9 and the thin part 36a at the sealing position S2, and provides sealing between the casing upper wall 9 and the thin part 36a by repulsive force from compression. A protrusion 37 extending upward (that is, to a thin part 19b side) is provided in a range where the sealing position S2 is present on the upper surface of the thin part 36a. The protrusion 37 surrounds the entire periphery of the cylinder part 14. The protrusion 37 makes contact with the thin part 19b, and compresses the thin part 19b together with the casing upper wall 9 (strictly speaking, the casing upper wall 9 at a portion facing the protrusion 37). A clearance between the casing upper wall 9 and the protrusion 37 is shorter than a clearance between the casing upper wall 9 and the thin part 36a at the sealing position S2 excluding the protrusion 37. Due to this, a compression rate of the thin part 19b at a portion where the protrusion 37 is in contact is higher than a compression rate of the thin part 19b at the scaling position S2 excluding the protrusion 37. In the present embodiment, the thin part 196 is compressed by about 30% at the portion where the protrusion 37 is in contact. That is, the compression rate (about 50%) of the thick part 19a by the protrusion 17 positioned on the casing outer side relative to the protrusion 37 is higher than the compression rate (about 30%) of the thin part 19b by the protrusion 37. Notably, the insulating member 36 corresponds to an example of a "first insulating member", the thin part 19b at the portion in contact with the thin part 36a corresponds to an example of a "second scaling part", and the protrusion 37 corresponds to an example of a "first protrusion".

The thick part 36b having a thick thickness in the up and down direction is provided on the casing inner side relative to the thin part 36a within the insulating member 36. The thick part 36b makes contact with both the casing upper wall 9 and the base part 15. The thick part 36b determines the clearance between the casing upper wall 9 and the base part 15. That is, the thick part 36b serves a role of a spacer. The thin part 19b and the thin part 36a make contact in the direction perpendicular to the axis by a length w1 over the entire periphery. In other words, the length of the sealing position S2 in the direction perpendicular to the axis is w1 over its entire periphery. On the other hand, a clearance having the length of w2 in the direction perpendicular to the axis is provided between a casing inner side-end face of the thick part 19a and a casing outer side-end face of the thin part 36a so as to surround the entire periphery of the cylinder part 14. Further, a clearance having a length of w3 in the direction perpendicular to the axis is provided between a casing inner side-end face of the thin part 19b and a casing outer side-end face of the thick part 36b so as to surround the entire periphery of the cylinder part 14. A relationship of w1>w2 is established between w1 and w2, and a relationship of w1>w3 is established between w1 and w3. Further, a relationship of w1>w2+w3 is also established.

On the casing inner side relative to the thick part 36b, the insulating member 36 includes a thin part 36c having a thin thickness in the up and down direction. The thin part 36c extends toward the casing inner side on the upper surface of the base part 15 and bends downward, covering an outer peripheral surface of the base part 15, and extends to substantially a same height as a breakable plate 34 (to be described later). A lower end face of the insulating member 36 (strictly speaking, the thin part 36c) makes contact with the insulating member 39. The insulating member 39 is made of PPS. The insulating member 39 covers an entire periphery of an outer peripheral portion of a lower surface of the breakable plate 34. A ring-shaped plate member 40 made of metal is arranged on outer peripheral surfaces of the insulating members 36, 39, and the plate member 40 is fixed to the insulating members 36, 39 by being riveted thereon. Due to this, the base part 15, a deformable plate 32 (to be described later), and the breakable plate 34 (to be described later) are retained and fixed in the up and down direction. Insulation between the plate member 40 and the base part 15, deformable plate 32, and breakable plate 34 is maintained by the insulating members 36, 39. Notably, a material of the insulating member 36 is not limited to the above, and a material having insulation property and electrolyte resistance property with superior strength property required for supporting load (for example, polyetheretherketone (PEEK)) may be used.

Within the space where the casing upper wall 9 and the base part 15 face each other, a range in the space overlapping with the fixation part 16 in a plan view of the casing upper wall 9 is termed a space 18. The space 18 surrounds the entire periphery of the cylinder part 14. The space 18 has apart of the sealing position S1 on the casing inner side, and the sealing position S2 positioned therein. Further, the protrusions 17, 37 are positioned in the space 18.

Within the space between the casing upper wall 9 and the rivet terminal 5, the space on the casing inner side than the thick part 19a of the sealing member 19 is termed a space 20. The space 20 has a cylindrical shape that surrounds the entire periphery of the cylinder part 14. An inner peripheral surface 20a of the space 20 is positioned at a boundary between the thick part 19a and the thin part 19b of the sealing member 19, and an outer peripheral surface 20b of the space 20 is positioned at a position of the outer peripheral surface of the base part 15. The space 20 has at least one of the thin part 19b of the sealing member 19 and the insulating member 36 over an entirety (that is, from the inner peripheral surface 20a to the outer peripheral surface 20b of the space 20) in a planar direction (that is, in a planar direction substantially vertical to the axial direction of the cylinder part 14). Notably, the space 20 corresponds to an example of a "first space", the inner peripheral surface 20a corresponds to an example of an "end face on the casing outer side", and the outer peripheral surface 20b corresponds to an example of an "end face on the casing inner side".

Next, the current interruption device 30 will be described. The current interruption device 30 includes the metal deformable plate 32 and the metal breakable plate 34. An outer peripheral portion of the deformable plate 32 is connected to an outer peripheral portion of the lower surface of the base part 15, and a lower end of the recess 15a of the base part 15 is covered by the deformable plate 32. Since inside of the recess 15a is maintained at the atmospheric pressure, the atmospheric pressure acts on an upper surface of the deformable plate 32. As described above, the base part 15, the deformable plate 32, and the breakable plate 34 are retained and fixed by the plate member 40 via the ring-shaped insulating members 36, 39. The deformable plate 32 is a circular conductive diaphragm, and is protruding downward. A center of the deformable plate 32 is connected to the breakable plate 34. The breakable plate 34 is a circular plate member, and is positioned under the deformable plate 32. The breakable plate 34 has the connector terminal 23 connected thereto. A groove 34a is provided at a center of the lower surface of the breakable plate 34. The breakable plate 34 and the center of the deformable plate 32 are connected inside the groove 34a. A mechanical strength of the breakable plate 34 at the position where the groove 34a is provided is lower than a mechanical strength of the breakable plate 34 at positions other than the groove 34a. A ventilation hole 34b is provided on the breakable plate 34, and a space 46 between the deformable plate 32 and the breakable plate 34 is communicated to the space inside the casing 1. Further, a ring-shaped insulating member 38 is provided between the outer peripheral portion of the deformable plate 32 and the outer peripheral portion of the breakable plate 34.

The current interruption device 30 includes an electrical conduction passage that serially connects the connector terminal 23, the breakable plate 34, the deformable plate 32, and the rivet terminal 5. Due to this, the electrode assembly 3 and the rivet terminal 5 are electrically connected via the electrical conduction passage of the current interruption device 30.

Here, an interruption operation of the current interruption device 30 will be described. In the aforementioned electricity storage device 100, the rivet terminal 5 and the rivet terminal 7 are in an electrically conductable state. When a pressure in the casing 1 rises, a pressure acting on the lower surface of the deformable plate 32 increases through the ventilation hole 34b. On the other hand, the atmospheric pressure acts on the upper surface of the deformable plate 32. Due to this, when the internal pressure of the casing 1 rises and reaches a second predetermined value that is larger than a first predetermined value, the deformable plate 32 inverts and changes to a state of protruding upward. When this happens, the breakable plate 34 that had been connected to the center of the deformable plate 32 breaks from the groove 34a, which is mechanically weak. Due to this, the electrical conduction passage connecting the breakable plate 34 and the deformable plate 32 is interrupted, and the electric conduction of the electrode assembly 3 and the rivet terminal 5 is interrupted. At this occasion, the deformable plate 32 is insulated from the connector terminal 23, and the breakable plate 34 is insulated from the rivet terminal 5.

Effects of the electricity storage device 100 of the first embodiment will be described. In the aforementioned electricity storage device 100, the space between the rivet terminal 5 and the casing upper wall 9 is sealed by the thick part 19a of the sealing member 19 at the sealing position S1. Due to this, the electrolyte within the casing 1 is suppressed from leaking out to the space on the casing outer side than the thick part 19a. Further, in the space 20, at least one of the thin part 19b of the sealing member 19 and the insulating member 36 is arranged over its entirety in the planar direction. Due to this, the rivet terminal 5 and the casing upper wall 9 do not face each other directly in the space 20. Thus, even if a high voltage is applied between the rivet terminal 5 and the casing upper wall 9 in a state where the electrolyte is present in the space 20, the rivet terminal 5 and the easing upper wall 9 can be suppressed from becoming short circuited.

Especially, in the present embodiment, the space between the casing upper wall 9 and the thin part 36a of the insulating member 36 is sealed by the thin part 19b of the sealing member 19 at the sealing position S2. Due to this, the electrolyte flowing to the casing outer side through a small clearance between the casing upper wall 9 and the thick part 36b of the insulating member 36 and the electrolyte flowing to the casing outer side through a small clearance between the insulating member 36 and the base part 15 are suppressed from making contact. Thus, in the space 20, the rivet terminal 5 and the casing upper wall 9 are suppressed from making contact via the electrolyte, and the short circuiting of the rivet terminal 5 and the casing upper wall 9 is further suppressed.

Moreover, in the present embodiment, the protrusion 37 is provided in the range where the sealing position S2 is present on the upper surface of the thin part 36a, and the protrusion 37 makes contact with the thin part 19b. Due to this, the sealing force of the thin part 19b increases at the portion where the protrusion 37 makes contact, and the electrolyte is further suppressed from flowing out to the casing outer side through the clearances between the thin part 19b and the casing upper wall 9, and/or between the thin part 19b and the thin part 36a. Further, the compression rate of the thin part 19b at the portion where the protrusion 37 makes contact is higher than the compression rate of the thin part 19b at the sealing position S2 excluding the protrusion 37. That is, the compression rate of the thin part 19b at the sealing position S2 is locally increased at the portion where the protrusion 37 makes contact. Due to this, as compared to a configuration in which the thin part 19b is compressed over the entirety of the sealing position S2 to about the same degree as the compression rate in the portion making contact with the protrusion 37, the repulsive force of the thin part 19b upon fixing the rivet terminal 5 to the casing upper wall 9 can be reduced. According to this configuration, the rivet terminal 5 can relatively easily be riveted to the casing upper wall 9 while increasing the sealing force between the casing upper wall 9 and the thin part 36a.

Further, in the present embodiment, the protrusion 17 is provided an the base part 15 in the range where the sealing position S1 is present and where the casing upper wall 9 and the base part 15 face each other, and the protrusion 17 makes contact with the thick part 19a. Due to this, the sealing force of the thick part 19a increases at the portion where the protrusion 17 makes contact, and the electrolyte is further suppressed from leaking to the space outside the casing. Further, the compression rate of the thick part 19a at the portion where the protrusion 17 makes contact is higher than the compression rate of the thick part 19a at the sealing position S1 excluding the protrusion 17. That is, the compression rate of the thick part 19a at the sealing position S1 is locally increased at the portion where the protrusion 17 makes contact. Due to this, as compared to a configuration in which the thick part 19a is compressed over the entirety of the sealing position S1 to about the same degree as the compression rate in the portion making contact with the protrusion 17, the repulsive force of the thick part 19a upon fixing the rivet terminal 5 to the casing upper wall 9 can be reduced. According to this configuration, the rivet terminal 5 can relatively easily be riveted to the casing upper wall 9 while increasing the sealing force between the casing upper wall 9 and the rivet terminal 5.

Further, generally, the repulsive force of the sealing member 19 upon riveting the rivet terminal 5 to the casing upper wall 9 becomes smaller on a closer side to the cylinder part 14, if the compression rate of the sealing member 19 at the time of riveting is the same. In the present embodiment, the compression rate of the thick part 19a by the protrusion 17 positioned closer to the cylinder part 14 than the protrusion 37 is higher than the compression rate of the thin part 19b by the protrusion 37. Due to this, the repulsive force of the sealing member 19 upon the riveting can be suppressed from increasing while increasing the sealing force of the thick part 19a by the protrusion 17 than the sealing force of the thin part 19b by the protrusion 37. Further, in the present embodiment, the protrusion 17 that compresses the sealing member 19 at a higher compression rate is positioned on the casing outer side relative to the protrusion 37, thus the leakage of the electrolyte is suppressed by these two levels. Thus, an electrolyte leakage suppressing effect can be improved.

Further, in the present embodiment, a part of the sealing position S1 on the casing inner side is positioned in the space 18. That is, the part of the sealing position S1 on the casing inner side is positioned in the range where the rivet terminal 5 and the casing upper wall 9 overlap in the state of seeing the casing upper wall 9 in the plan view, and where the fixation part 16 is present. Due to this, the direction of the load that the fixation part 16 applies to the casing upper wall 9 and the direction of the compressing force for sealing between the rivet terminal 5 and the casing upper wall 9 become same, so a strong sealing can be provided between the rivet terminal 5 and the casing upper wall 9 at the part of the sealing position S1 on the casing inner side. Especially, in the present embodiment, the sealing position S2 is positioned also in the space 18. Due to this, in the scaling position S2 as well, a strong sealing can be provided between the casing upper wall 9 and the thin part 36a of the insulating member 36. Furthermore, the protrusions 17, 37 are also positioned in the space 18. Due to this, the scaling force of the sealing member 19 at portions making contact with the protrusions 17, 37 can further be increased.

Notably, in an electricity storage device module provided with a plurality of electricity storage devices 100, the electricity storage devices 100 are connected serially, and are connected in serial until a desired voltage can be achieved. Due to this, a high power and large capacity electricity storage device module can be configured. In such an electricity storage device module, a high voltage is often applied between the rivet terminal 5 and the casing upper wall 9 in each of the electricity storage devices 100. Due to this, by employing the configuration of the present embodiment in each of the electricity storage devices 100 configuring the electricity storage device module, a possibility of the short circuiting can effectively be reduced.

SECOND EMBODIMENT

Figure 3:
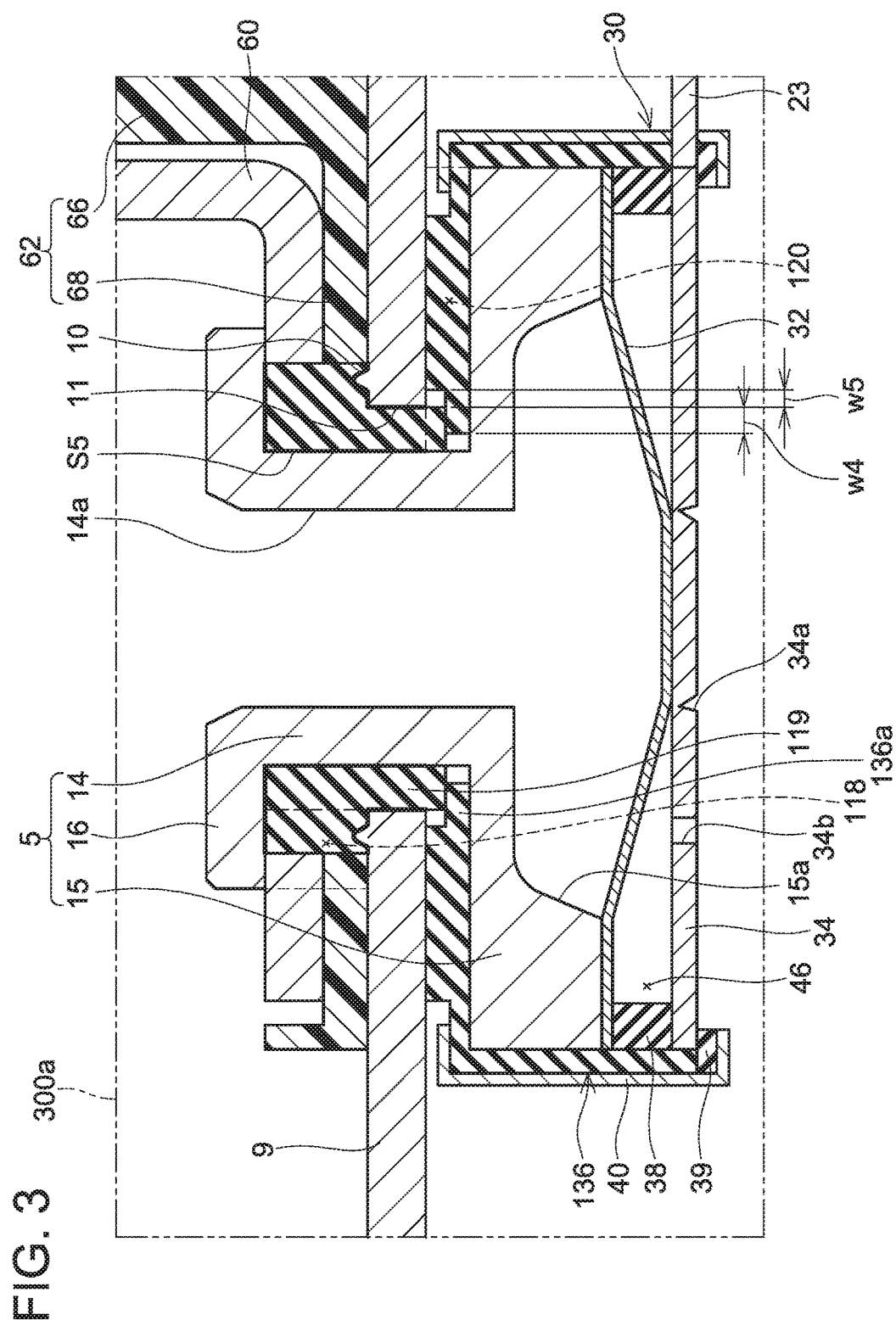
FIG. 3 is a partial enlarged view in a vicinity of a rivet terminal configuring a negative terminal of an electricity storage device of a second embodiment.

Next, a second embodiment will be described with reference to FIG. 3. Hereinbelow, only the features differing from the first embodiment will be described, and configurations identical to the first embodiment will be omitted for their detailed description. The same applies to other embodiments and variants. A two-dot chain line portion 300a of FIG. 3 corresponds to the two-dot chain line portion 200a of FIG. 1. A sealing member 119 is arranged between the cylinder part 14 and the casing upper wall 9 as well as between the fixation part 16 and the casing upper wall 9. The sealing member 119 makes contact with the cylinder part 14 as well as with the fixation part 16 and casing upper wall 9 at a sealing position S5, and provides sealing between them. In a range where the sealing position S5 is present and where the fixation part 16 and the casing upper wall 9 overlap each other in the plan view of the casing upper wall 9, a protrusion 10 extending upward (that is, to a fixation part 16 side) and surrounding the entire periphery of the cylinder part 14 is provided on the upper surface of the casing upper wall 9. The protrusion 10 compresses the sealing member 119 together with the fixation part 16. A space where the casing upper wall 9 and the fixation part 16 face each other is termed a space 118. The space 118 has a part of the sealing position S5 on the casing outer side (more specifically, the protrusion 10) positioned therein. Notably, the sealing member 119 corresponds to an example of a "first sealing member", the sealing member 119 at the portion positioned between the casing upper wall 9, the cylinder part 14, and the fixation part 16 corresponds to an example of a "first sealing part", and the protrusion 10 corresponds to an example of a "second protrusion".

An insulating member 136 is provided on the casing inner side relative to the sealing member 119. A thin part 136a is provided at a casing outer side-end of the insulating member 136. The thin part 136a makes contact with the sealing member 119 in the direction perpendicular to the axis by a length of w4. On the other hand, a clearance with a length of w5 in the direction perpendicular to the axis is provided between the sealing member 119 and the insulating member 136 over a peripheral direction. A relationship of w4>w5 is established between w4 and w5. Within the space between the rivet terminal 5 and the casing upper wall 9, a space on the casing inner side than the sealing position S5 is termed a space 120. The space 120 has at least one of the sealing member 119 and the insulating member 136 over an entirety in the planar direction. Notably, the insulating member 136 corresponds to an example of a "first insulating member", and the space 120 corresponds to an example of a "first space".

According to this configuration, since the rivet terminal 5 and the casing upper wall 9 do not face each other directly in the space 120, they can be suppressed from being short circuited. Further, by providing the protrusion 10, the scaling force by which the sealing member 119 seals between the rivet terminal 5 and the casing upper wall 9 can be increased, and the electrolyte can further be suppressed from leaking to the space outside the casing. Further, by locally compressing the sealing member 119 by the protrusion 10, as compared to a configuration in which the scaling member 119 is compressed over the entirety of the sealing position S5, the rivet terminal 5 can relatively easily be riveted to the casing upper wall 9 while increasing the sealing force. Further, since a part of the sealing position S5 on the casing outer side is positioned in the space 118, a strong sealing can be provided between the rivet terminal 5 and the casing upper wall 9 at the part of the sealing position S5 on the casing outer side. Especially in the present embodiment, since the protrusion 10 is positioned in the space 118, the sealing force of the sealing member 119 at the portion in contact with the protrusion 10 can further be increased.

THIRD EMBODIMENT

Figure 4:
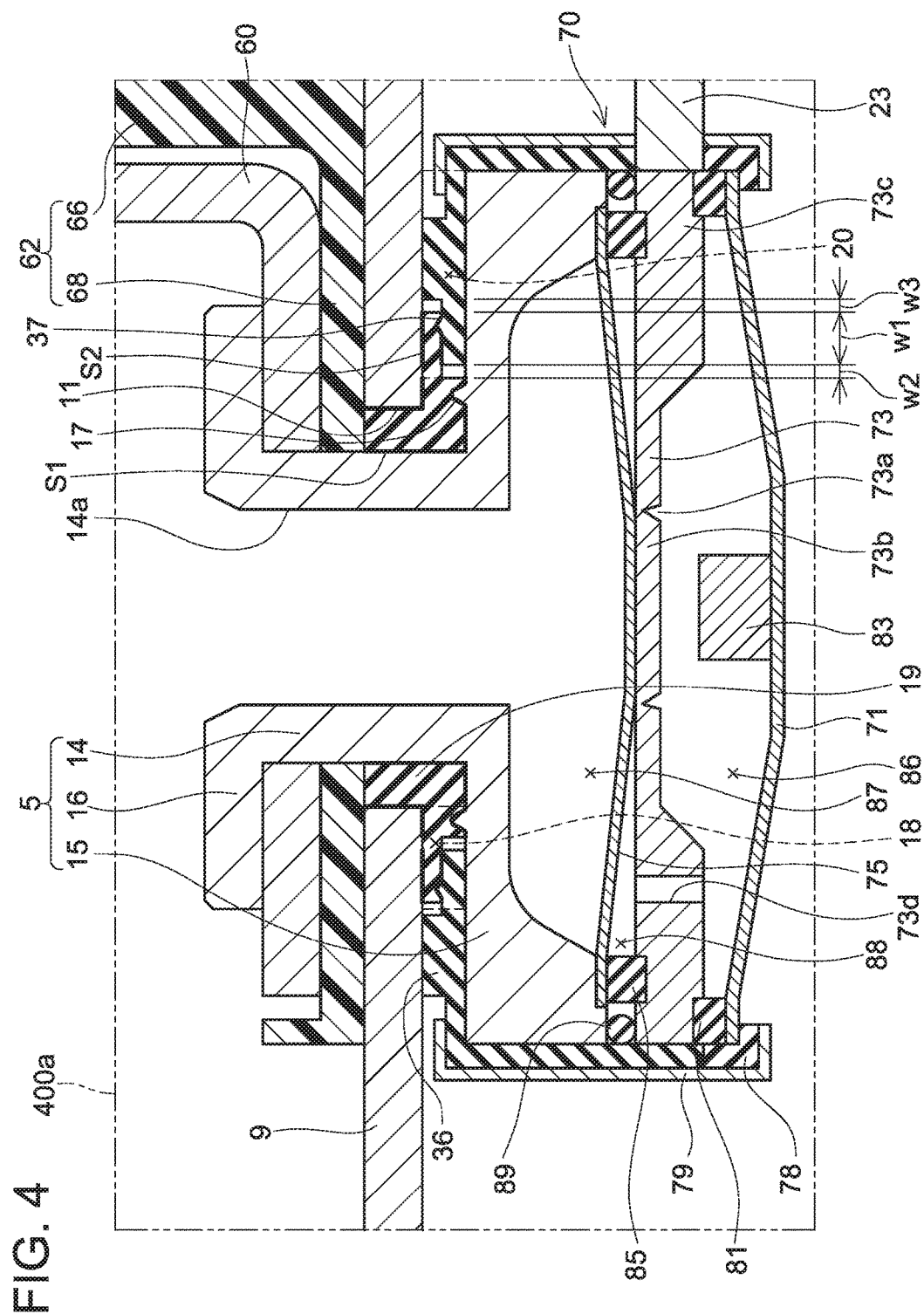
FIG. 4 is a partial enlarged view in a vicinity of a rivet terminal configuring a negative terminal of an electricity storage device of a third embodiment.

Next, a third embodiment will be described with reference to FIG. 4. A two-dot chain line portion 400a of FIG. 4 corresponds to the two-dot chain line portion 200a of FIG. 1. In this electricity storage device, a configuration of the current interruption device differs from that of the first embodiment, and other configurations are similar to those of the first embodiment.

The current interruption device 70 includes a metal first deformable plate 75, a metal breakable plate 73, and a metal second deformable plate 71. The base part 15, the first deformable plate 75, the breakable plate 73, and the second deformable plate 71 are supported by insulating members 36, 78 having an insulating property. A metal plate member 79 is riveted to outer peripheral surfaces of the insulating members 36, 78. Due to this, the base part 15, the first deformable plate 75, the breakable plate 73, and the second deformable plate 71 are retained in the up and down direction.

The second deformable plate 71 is arranged under the breakable plate 73, and has its center protruding downward. An insulating member 81 is provided on an outer peripheral portion of an upper surface of the second deformable plate 71. Further, a protrusion 83 protruding upward is provided on a center of the upper surface of the second deformable plate 71. A center portion 73b of the breakable plate 73 (portion surrounded by a groove 73a) is positioned above the protrusion 83. A pressure of the space in the casing 1 acts on a lower surface of the second deformable plate 71. A pressure of a space 86 between the second deformable plate 71 and the breakable plate 73 acts on the upper surface of the second deformable plate 71 (to be described later). The space 86 is sealed from the space in the casing 1.

The breakable plate 73 is arranged between the second deformable plate 71 and the first deformable plate 75. The breakable plate 73 is partitioned into the center portion 73b surrounded by the groove 73a, and an outer peripheral portion 73c positioned on an outer peripheral side of the groove 73a. A thickness of the center portion 73b is made thin, and a thickness of the outer peripheral portion 73c is made thick. A ventilation hole 73d is provided on the breakable plate 73. The space 86 communicates with a space 88 between the first deformable plate 75 and the breakable plate 73 through the ventilation hole 73d.

The first deformable plate 75 is arranged above the breakable plate 73. The first deformable plate 75 has substantially the same configuration as the deformable plate 32 of the first embodiment. An insulating member 85 is provided between the first deformable plate 75 and the breakable plate 73. A space 87 is provided between the upper surface of the first deformable plate 75 and the lower surface of the base part 15. The space 87 is maintained at the atmospheric pressure. A sealing member 89 is provided between the outer peripheral portions of the breakable plate 73 and the base part 15, sealing a clearance between the base part 15 and the breakable plate 73.

The current interruption device 70 includes an electrical conduction passage that serially connects the connector terminal 23, the breakable plate 73, the first deformable plate 75, and the rivet terminal 5. Due to this, the electrode assembly 3 and the rivet terminal 5 are electrically connected via the electrical conduction passage of the current interruption device 70.

Here, an interruption operation of the current interruption device 70 will be described. In the aforementioned electricity storage device, the rivet terminal 5 and the rivet terminal 7 are in the electrically conductable state. When the pressure in the casing 1 rises, a pressure acting on the lower surface of the second deformable plate 71 increases. On the other hand, the pressure of the space 86 sealed from the space of the casing 1 acts on the upper surface of the second deformable plate 71. Due to this, when the internal pressure of the casing 1 rises and reaches a third predetermined value, the second deformable plate 71 inverts and changes from a state of protruding downward to a state of protruding upward. When this happens, the air in the space 86 moves to the space 88 through the ventilation hole 73d, and the pressure in the space 88 increases. Further, when the second deformable plate 71 inverts, the protrusion 83 of the second deformable plate 71 collides with the center portion 73b of the breakable plate 73, and the breakable plate 73 breaks at the groove 73a. Due to this, the first deformable plate 75 inverts, and the first deformable plate 75 and the center portion 73b of the breakable plate 73 are displaced upward. Due to this, the electrical conduction passage connecting the breakable plate 73 and the first deformable plate 75 is interrupted, and the electric conduction of the electrode assembly 3 and the rivet terminal 5 is interrupted. At this occasion, the first deformable plate 75 is insulated from the connector terminal 23, and the breakable plate 73 is insulated from the rivet terminal 5. In the present embodiment, a part of the sealing member 19 and the insulating member 36 are arranged over the entirety of the space 20 even after the current interruption device 70 had operated. According to this configuration as well, similar effects as those of the electricity storage device 100 of the first embodiment can be achieved. Notably, the aforementioned current interruption device 70 may be attached to electricity storage devices of the other embodiments and the variants.

FOURTH EMBODIMENT

Figure 5:
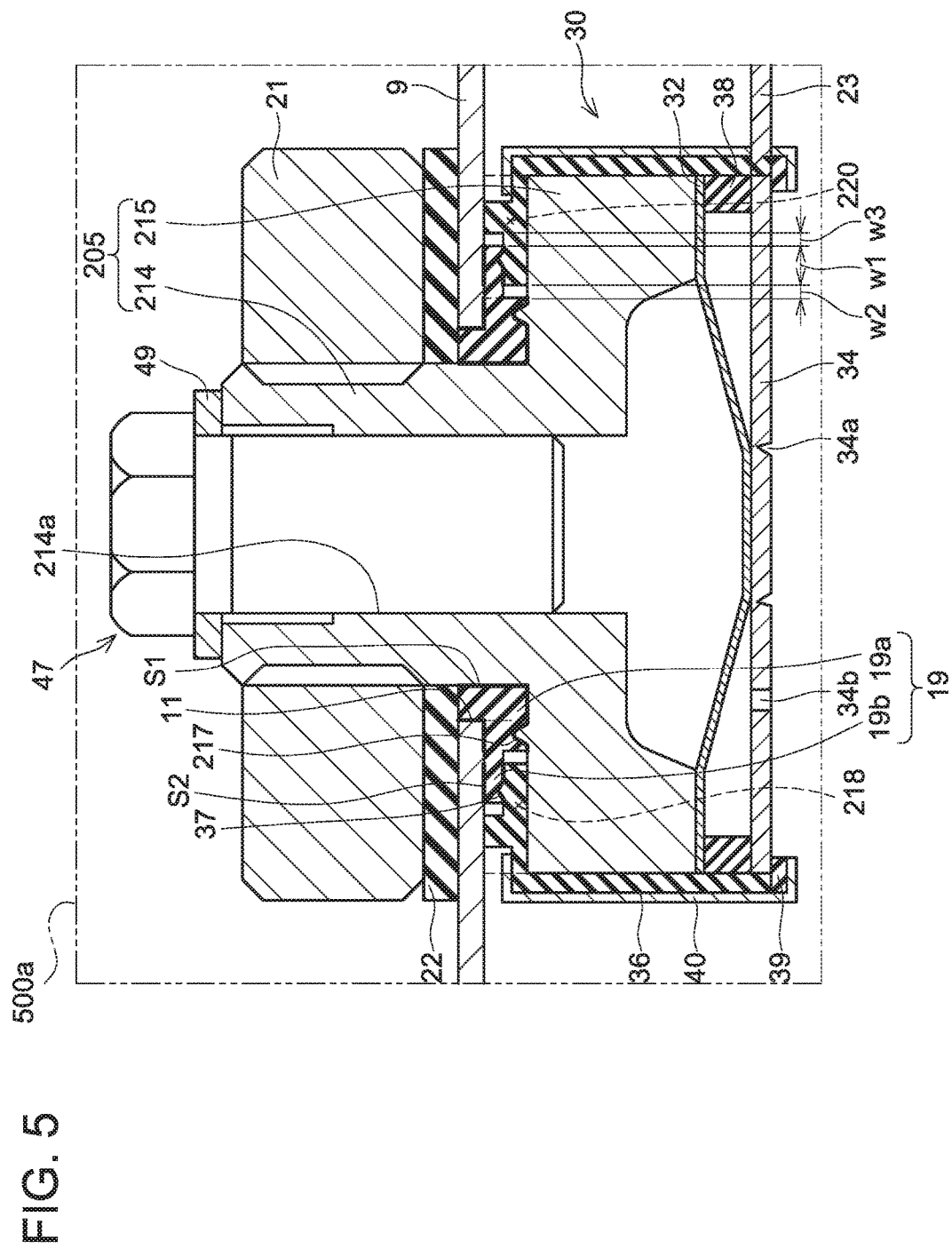
FIG. 5 is a partial enlarged view in a vicinity of a negative terminal of an electricity storage device of a fourth embodiment.

Next, a fourth embodiment will be described with reference to FIG. 5. A two-dot chain line portion 500a of FIG. 5 corresponds to the two-dot chain line portion 200a of FIG. 1. In this electricity storage device, a configuration of a negative terminal 205 differs from that of the first embodiment. The negative terminal 205 includes a cylinder part 214 and a base part 215. Upon fixing the negative terminal 205 to the casing upper wall 9, the cylinder part 214 is inserted into the opening 11 of the casing upper wall 9 from inside the casing 1 in a state where the cylinder part 214 is passed through the respective openings of the insulating member 36, the plate member 40, and the sealing member 19. Then, a ring-shaped insulating member 22 is attached to the cylinder part 214 from outside the casing 1, and is made to contact the casing upper wall 9. After this, a nut 21 is screwed onto the cylinder part 214 from outside the casing 1. Due to this, the negative terminal 205 is fixed to the casing upper wall 9, and the sealing member 19 and the insulating member 36 are retained between the casing upper wall 9 and the base part 215. The negative terminal 205 is provided with a through hole 214a in the axial direction (up and down direction). A bus bar bolt 47 is attached to the through hole 214a. A bus bar 49 is arranged between a head of the bus bar bolt 47 and the negative terminal 205. When the bus bar bolt 47 is attached to the through hole 214a, the bus bar 49 is retained by the head of the bus bar bolt 47 and the negative terminal 205. Notably, the negative terminal 205 corresponds to an example of a "terminal".

In the range where the sealing position S1 is present and where the casing upper wall 9 and the base part 215 face each other, a protrusion 217 is provided on an upper surface of the base part 215. The protrusion 217 has substantially the same configuration as the protrusion 17 of the first embodiment Within the space where the casing upper wall 9 and the base part 215 face each other, a range in the space overlapping with the nut 21 in the plan view of the casing upper wall 9 is termed a space 218. A part of the sealing position S1 on the casing inner side and the sealing position S2 are positioned in the space 218. The protrusions 217, 37 are positioned in the space 218. Within the space between the negative terminal 205 and the casing upper wall 9, the space on the casing inner side than the thick part 19*a* is termed a space 220. The space 220 has at least one of the thin part 19*b* and the insulating member 36 provided over its entirety in the planar direction. According to this configuration as well, similar effects as those of the electricity storage device 100 of the first embodiment can be achieved. Further, in the present embodiment, a part of the sealing position S1 is positioned in the space 218. Due to this, a direction of tightening force that the nut 21 applies on the casing upper wall 9 and a direction of the compression force for sealing between the casing upper wall 9 and the base part 215 become same, thus a strong sealing can be provided between the casing upper wall 9 and the base part 215 at the part of the sealing position S1. Especially in the present embodiment, since the sealing position S2 is also positioned in the space 218, a strong sealing can be provided between the casing upper wall 9 and the insulating member 36. Furthermore, since the protrusions 217, 37 are positioned in the space 218, the sealing force of the sealing member 19 at the portions in contact with the protrusions 217, 37 can further be increased. Notably, the protrusion 217 corresponds to an example of a "second protrusion", and the space 220 corresponds to an example of a "first space".

FIFTH EMBODIMENT

Figure 6:
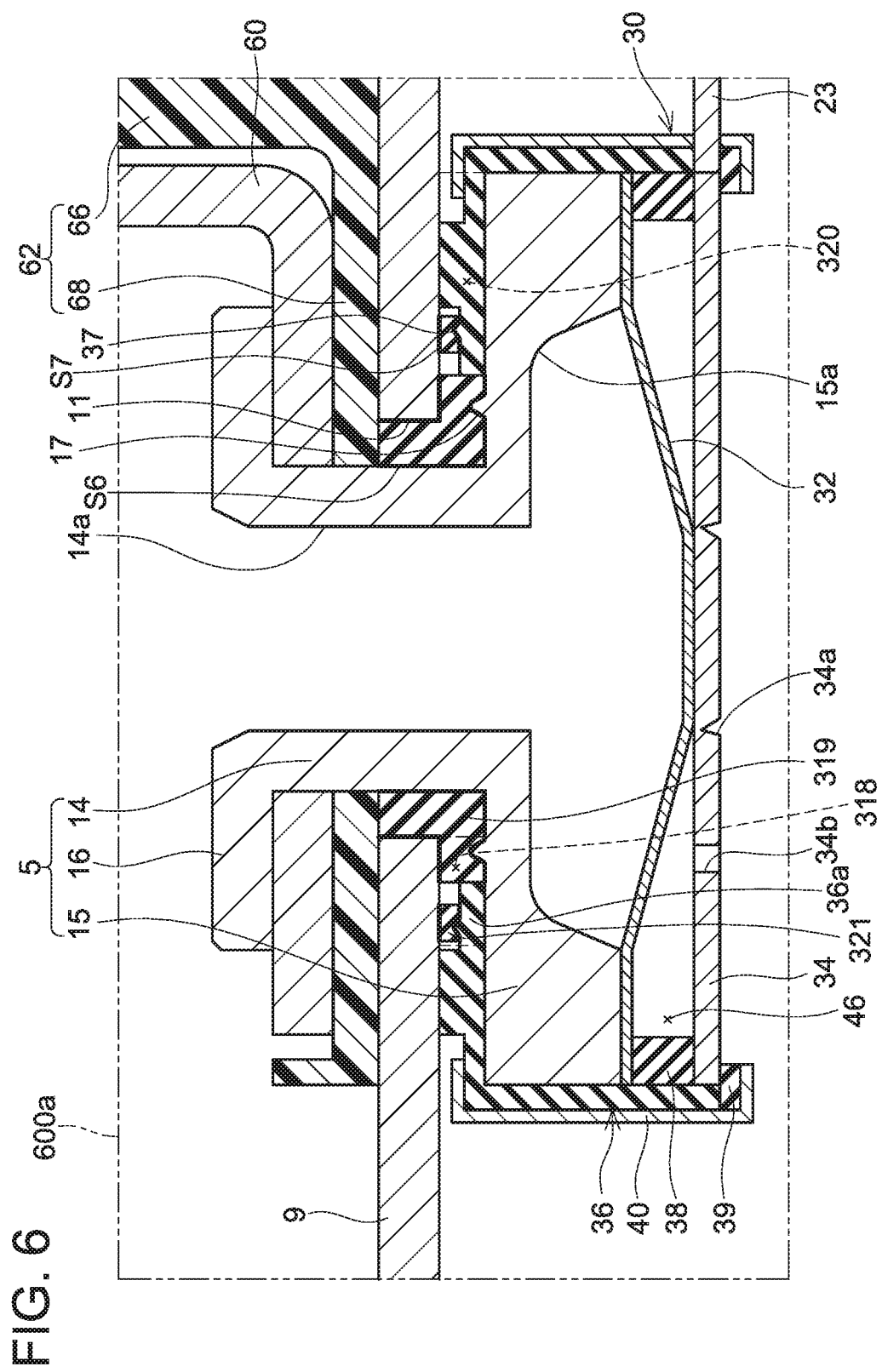
FIG. 6 is a partial enlarged view in a vicinity of a negative terminal of an electricity storage device of a fifth embodiment.

Next, a fifth embodiment will be described with reference to FIG. 6. A two-dot chain line portion 600*a* of FIG. 6 corresponds to the two-dot chain line portion 200*a* of FIG. 1. In this embodiment, two sealing members 319, 321 surrounding the entire periphery of the cylinder part 14 are provided instead of the sealing member 19. The sealing member 319 is made of PFA, and the sealing member 321 is made of polytetrafluoroethylene (PTFE). The sealing member 319 seals between the casing upper wall 9 and the rivet terminal 5 at a sealing position S6. A protrusion 17 is provided on the upper surface of the base part 15 in a range where the scaling position S6 is present and where the casing upper wall 9 and the base part 15 overlap in the plan view of the casing upper wall 9. The sealing member 319 is compressed by about 50% by the protrusion 17. The insulating member 36 is provided on the upper surface of the base part 15 on the casing inner side relative to the sealing member 319. The thin part 36*a* of the insulating member 36 makes contact with the sealing member 319. The sealing member 321 that seals between the casing upper wall 9 and the thin part 36*a* at a sealing position S7 is provided in the space where the casing upper wall 9 and the thin part 36*a* face each other. Within a range where the sealing position S7 is present, a protrusion 37 is provided on the upper surface of the thin part 36*a*. The sealing member 321 is compressed by about 30% by the protrusion 37. Notably, the sealing member 319 corresponds to an example of a "second sealing member", the sealing member 321 corresponds to an example of a "third sealing member" and a "fourth sealing part", and the insulating member 36 corresponds to an example of a "second insulating member".

Within the space where the casing upper wall 9 and the base part 15 face each other a range in the space overlapping with the fixation part 16 in the plan view of the casing upper wall 9 is termed a space 318. A part of the sealing position S6 on the casing inner side and the sealing position S7 are positioned in the space 318. The protrusions 17, 37 are positioned in the space 318. Further, within the space between the rivet terminal 5 and the casing upper wall 9, the space on the casing inner side than the sealing position S6 is termed a space 320. The space 320 has at least one of the sealing member 321 and the insulating member 36 provided over its entirety in the planar direction. According to this configuration as well, similar effects as those of the electricity storage device 100 of the first embodiment can be achieved. Further, in the present embodiment, the sealing member to which the protrusion 17 contacts (that is, the sealing member 319) is different from the sealing member to which the protrusion 37 contacts (that is, the sealing member 321). Due to this, the sealing members 319, 321 can be made of different materials, so compression rates of the sealing members 319, 321 can easily be adjusted. Notably, the space 320 corresponds to an example of a "second space".

SIXTH EMBODIMENT

Figure 7:
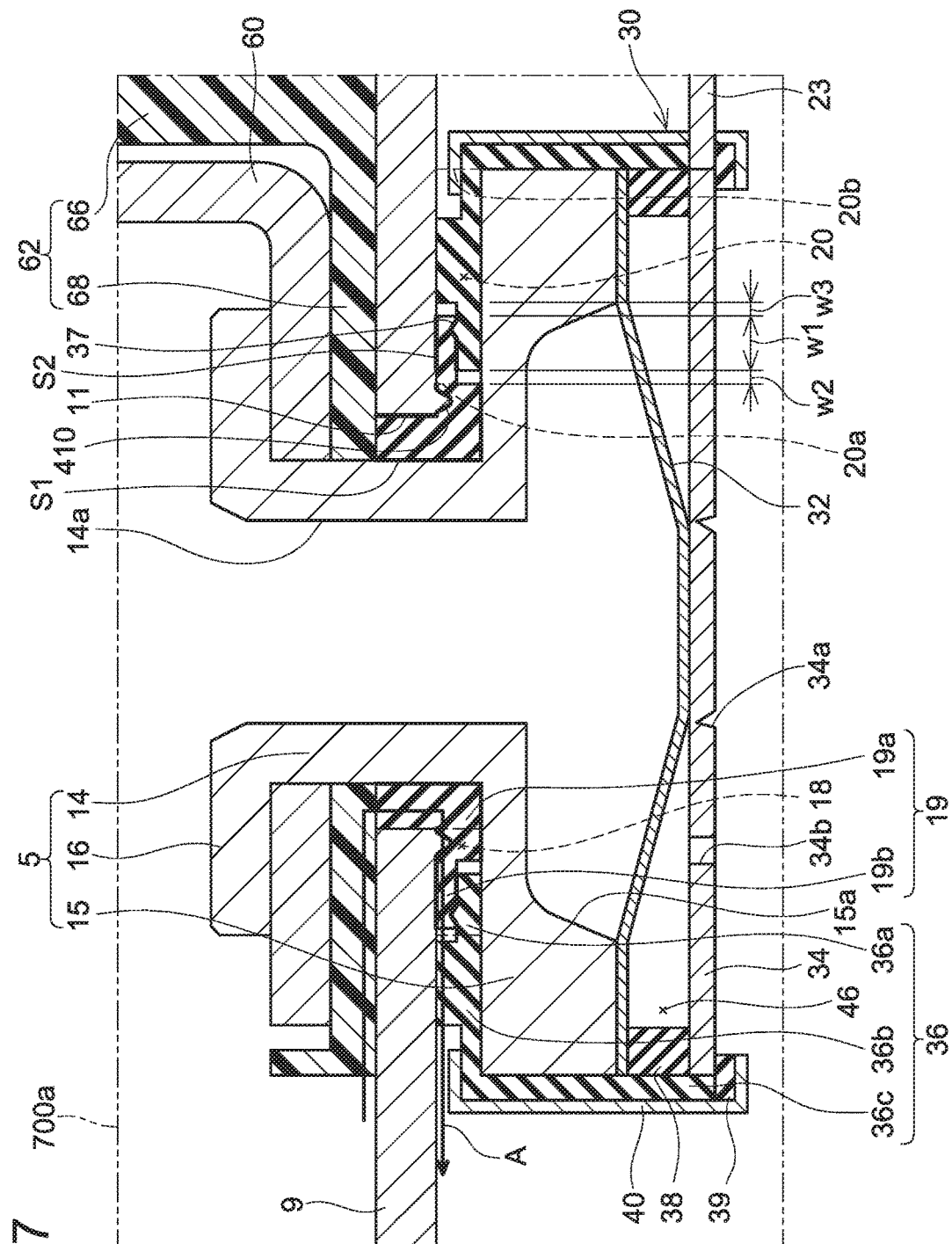
FIG. 7 is a partial enlarged view in a vicinity of a negative terminal of an electricity storage device of a sixth embodiment.

Next, a sixth embodiment will be described with reference to FIG. 7. A two-dot chain line portion 700*a* of FIG. 7 corresponds to the two-dot chain line portion 200*a* of FIG. 1. An electricity storage device of the sixth embodiment differs from the electricity storage device of the second embodiment in that a protrusion 410 is provided instead of the protrusion 17. That is, in the present embodiment, the protrusion 410 extending downward is provided on the lower surface of the casing upper wall 9 in a range where the sealing position S1 is present and where the casing upper wall 9 and the base part 15 overlap in the plan view of the casing upper wall 9. The protrusion 410 surrounds the entire periphery of the cylinder part 14. The protrusion 410 makes contact with the thick part 19*a*, and compresses the thick part 19*a* together with the base part 15 (strictly speaking, the base part 15 at a portion facing the protrusion 410). The compression rate of the thick part 19*a* at the portion where the protrusion 410 makes contact is higher than the compression rate of the thick part 19*a* at the sealing position S1 excluding the protrusion 410. In the present embodiment, the thick part 19*a* is compressed by about 50% at the portion where the protrusion 410 is in contact. Further, as described in the first embodiment, the protrusion 37 extending upward is provided in the range where the sealing position S2 is present on the upper surface of the thin part 36*a*. In the present embodiment, the thin part 19*b* is compressed by about 30% at the portion where the protrusion 37 is in contact. That is, the compression rate (about 50%) of the thick part 19*a* by the protrusion 17 positioned on the casing outer side (that is, on the cylinder part 14 side) relative to the protrusion 37 is higher than the compression rate (about 30%) of the thin part 19*b* by the protrusion 37. According to this configuration as well, similar effects as those of the first embodiment can be achieved. Further, by providing the protrusion 410 on the casing upper wall 9 side instead of the base part 15, the protrusion 410 can easily be arranged in the "range where the sealing portion S1 is present and where the casing upper wall 9 and the base part 15 overlap in the plan view of the casing upper wall 9".

The embodiments of the technique disclosed herein have been described in detail, however, these are mere examples, and an electricity storage device disclosed herein includes various alterations and modifications of the aforementioned embodiments. For example, in a configuration in which at least one of the sealing member 19 and the insulating member 36 is arranged in the space 20, no sealing may be provided between the casing upper wall 9 and the insulating member 36 (strictly speaking, the thin part 36a).

Further, the protrusions 17, 37 may not be provided, or only one of the protrusions 17, 37 may be provided. Further, the protrusion 37 is not limited to the configuration of being provided on the insulating member 36, and may for example be provided on the casing upper wall 9 and/or the rivet terminals 5, 7. Since the casing upper wall 9 and the rivet terminals 5, 7 are made of metal with high rigidity, the sealing member 19 can suitably be compressed with the protrusion 37 provided on these members. Further the protrusions 17, 37 may respectively be provided in plurality. Further, the compression rates of the sealing member 19 by the protrusions 17, 37 are not limited to the rates exemplified in the embodiments. For example, the compression rate of the thick part 19a by the protrusion positioned on the cylinder part 14 side (that is, the protrusion 17) may be adjusted in a range between about 30 to 80%, and the compression rate of the thin part 19b by the protrusion positioned at a position separated away from the cylinder part 14 (that is, the protrusion 37) may be adjusted in a range between about 0 to 50%. Further, the compression rate of the thick part 19a by the protrusion positioned at the position separated away from the cylinder part 14 may be larger than the compression rate of the thick part 19a by the protrusion positioned on the cylinder part 14 side.

Further the thin part 19b of the sealing member 19 is not limited to the configuration of sealing between the casing upper wall 9 and the thin part 36a of the insulating member 36, and may seal between the base part 15 and the thin part 36a. Further, the sealing member 321 may seal between the base part 15 and the thin part 36a.

Further, in the third embodiment, the insulating member 81 may not be provided. Further, a ventilation hole to communicate the spaces 87 and 88 may be provided on the first deformable plate 75 to maintain the spaces 86, 88 at the atmospheric pressure.

Further, in the fifth embodiment, the thin part 319a may be provided at the casing inner side-end of the sealing member 319. The thin part 319a may be provided between the casing upper wall 9 and the thin part 36a of the insulating member 36, and provide sealing therebetween. In this case, at least one of the thin part 319a, the sealing member 319, and the insulating member 36 is to be arranged in the space 320, and the casing upper wall 9 and the base part 15 can be suppressed from facing each other directly in the space 320.

Further, the current interruption device 30 may be provided on the rivet terminal 7 side, or may be provided on both of the rivet terminal 5 and the rivet terminal 7. In a case of providing the current interruption device 30 on the rivet terminal 7 side, sealing members and insulating members are arranged between the rivet terminal 7 and the casing upper wall 9 as in the aforementioned embodiments. Further, in the aforementioned embodiments, the electric conduction with the breakable plate 34 is interrupted by the inverting motion of the deformable plate 32. However, how the deformable plate 32 deforms is not limited to inversions. For example, the electric conduction between the deformable plate 32 and the breakable plate 34 may be interrupted by the breakable plate 34 breaking from the groove 34a by the center of the deformable plate 32 deforming upward. The deformable plate 32 may deform in any way so long as the electric conduction between the deformable plate 32 and the breakable plate 34 can be interrupted. The same applies to the second deformable plate 75.

Further, in the aforementioned embodiments, the scaling member 19 is arranged in the space between the cylinder part 14 and the casing upper wall 9 (strictly speaking, the opening 11, however, no limitation is made to this configuration. For example, the sealing member 19 may be provided only in the space where the casing upper wall 9 and the base part 15 face each other. In this case, another sealing member sealing between the cylinder part 14 and the opening 11 (hereinbelow referred to as the sealing member 419) is preferably arranged between the cylinder part 14 and the opening 11. The sealing member 419 can suppress water and dust from outside the casing to enter inside the casing, and also serves a role of retaining the cylinder part 14 in the opening 11. As above, when the sealing member 19 is a separate body from the sealing member 419, the first insulating member may not be provided on the casing inner side of the sealing member 19 in configurations in which the thin part 19b is arranged over the entirety of the space 20 in the planar direction. Further, in this case, an insulating member functioning as a spacer may be provided between the sealing member 419 and the sealing member 19.

Further, in a case where the portion where the thin part 19b of the sealing member 19 and the thin part 36a of the insulating member 36 are in contact is positioned between the casing upper wall 9 and the base part 15, this portion may be positioned on a radially outer side than the space 18. That is, the protrusion 37 may be positioned on the radially outer side than the space 18.

Specific examples of the present invention are described above in detail, but these examples are merely illustrative and place no limitation on the scope of the claims. The technology described in the claims also encompasses various changes and modifications to the specific examples described above. The technical elements explained in the present disclosure or drawings provide technical utility either independently or through various combinations. The present invention is not limited to the combinations described at the time the claims are filed. Further, the purpose of the examples shown by the present disclosure or drawings is to satisfy multiple objectives simultaneously, and satisfying any one of those objectives gives technical utility to the present invention.

The invention claimed is:

1. An electricity storage device comprising:
    a casing configured to accommodate electrolyte and an electrode assembly including a positive electrode and a negative electrode;
    a terminal configured to extend from inside to outside of the casing through an opening provided on a terminal wall of the casing; and
    a current interruption device accommodated within the casing, electrically connected to the terminal and one of the positive electrode and the negative electrode, and comprising a conductive member configured to switch the terminal and the one of the positive electrode and the negative electrode from a conductive state to a non-conductive state,
    wherein
    the terminal comprises a column part inserted in the opening and a base part arranged on one end of the column part and disposed within the casing,
    the base part is larger than the opening in a plan view of the terminal wall and is electrically connected to the conductive member,
    a first sealing member having an insulating property and comprising a first sealing part sealing between the terminal and the terminal wall by being in contact with both of the terminal and the terminal wall is disposed between the terminal and the terminal wall, the first sealing member surrounds an entire periphery of the column part, a first insulating member having an insulating property is disposed within a first space provided between the terminal and the terminal wall on a casing inner side relative to the first sealing part, and surrounds the entire periphery of the column part, the first space extends from on a casing inner side end of the first sealing part to a casing inner side end of the base part, at least one of the first sealing member and the first insulating member is disposed in the first space from an end face of the first space on a casing outer side to an end face of the first space on the casing inner side, the first sealing member comprises a second sealing part sealing between the first insulating member and one of the terminal wall and the terminal by being in contact with both of the first insulating member and the one of the terminal wall and the terminal in a space where the first insulating member and the one of the terminal wall and the terminal face each other in a first direction viewed in the plan view of the terminal wall, a first protrusion is provided on at least one of the first insulating member, the terminal wall and the terminal in a range where the second sealing part is present, and projects toward a side of the first sealing member in the first direction, the first protrusion is in contact with the first sealing member.

2. The electricity storage device according to claim 1, wherein at least one of the first insulating member, the terminal wall and the terminal comprises a first contact surface in surface contact with the second sealing part, the first contact surface comprises the first protrusion, a first outer side planer part provided in the casing outer side relative to the first protrusion, and a first inner side planer part provided in the casing inner side relative to the first protrusion and in the same plane with the first outer side planer part, wherein the first protrusion projects toward the second sealing part in the first direction relative to the first outer side planer part and the first inner side planer part.

3. The electricity storage device according to claim 1, wherein the terminal comprises a fixation part arranged on the column part at an opposite side of a side where the base part is arranged on the column part, the fixation part being located outside the casing, and fixing the terminal to the terminal wall by bending outward in a direction perpendicular to an axis of the column part from the opposite side of the column part, and the first sealing part is located in a range where the terminal and the terminal wall overlap each other, and where the fixation part is present in the plan view of the terminal wall.

4. The electricity storage device according to claim 1, wherein the terminal is fastened and fixed to the terminal wall by a nut provided outside the casing, and the first sealing part is located in a range where the terminal and the terminal wall overlap each other, and where the nut is present in the plan view of the terminal wall.

5. An electricity storage device module comprising:

a plurality of the electricity storage devices according to claim 1, wherein the electricity storage devices are connected in series.

6. The electricity storage device according to claim 1, wherein a second protrusion is provided on one of the terminal and the terminal wall in an overlap range where the first sealing member is present and where the terminal and the terminal wall overlap each other in the plan view of the terminal wall, the second protrusion projecting in the first direction viewed in plan of the terminal wall toward the other of the terminal and the terminal wall, and the second protrusion is in contact with the first sealing member.

7. The electric storage device according to claim 6, wherein at least one of the terminal and the terminal wall comprises a second contact surface in surface contact with the first sealing part located in the overlap range, the second contact surface comprises the second protrusion, a second outer side planer part provided in the casing outer side relative to the second protrusion, and a second inner side planer part provided in the casing inner side relative to the second protrusion and in the same plane with the second outer side planer part, wherein the second protrusion projects toward the first sealing part located in the overlap range in the first direction relative to the second outer side planer part and the second inner side planer part.

8. The electricity storage device according to claim 6, wherein the first sealing member comprises a second sealing part sealing between the first insulating member and one of the terminal wall and the terminal by being in contact with both of the first insulating member and the one of the terminal wall and the terminal in a space where the first insulating member and the one of the terminal wall and the terminal face each other in the first direction viewed in plan of the terminal wall, a first protrusion is provided on at least one of the first insulating member, the terminal wall and the terminal in a range where the second sealing part is present, and projects toward a first sealing member side in the first direction, the first protrusion is in contact with the first sealing member, and a compression rate of the first sealing member at a portion in contact with one protrusion which is close to the column part of the terminal and being one of the first protrusion and the second protrusion is larger than a compression rate of the first sealing member at a portion in contact with the other protrusion which is apart from the column part of the terminal and being the other of the first protrusion and the second protrusion.

9. The electricity storage device according to claim 1, wherein the second sealing part seals between the terminal wall and the first insulating member by being in contact with both of the terminal wall and the first insulating member in a space where the terminal wall and the first insulating member face each other in the first direction.

10. The electricity storage device according to claim 9, wherein a first protrusion is provided on the first insulating member in a range where the second sealing part is present, and projects toward a side of the first sealing member in the first direction,
the first protrusion is in contact with the first sealing member,
a second protrusion is provided on the terminal wall in an overlap range where the first sealing member is present and where the terminal and the terminal wall overlap each other in the plan view of the terminal wall, and projects in the first direction toward the terminal,
the second protrusion is in contact with the first sealing member.

* * * * *